(12) United States Patent  
May et al.

(10) Patent No.: US 6,671,007 B1  
(45) Date of Patent: Dec. 30, 2003

(54) METHOD AND APPARATUS FOR MOUNTING A DEGAUSSING COIL

(75) Inventors: Eric Richard May, Indianapolis, IN (US); Darin Bradley Ritter, Indianapolis, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/476,712

(22) Filed: Dec. 30, 1999

(51) Int. Cl.[7] ............................................. H04N 5/645
(52) U.S. Cl. ...................... 348/825; 348/821; 361/150
(58) Field of Search ................. 348/825, 821; 361/150

(56) References Cited

U.S. PATENT DOCUMENTS

| | | | | |
|---|---|---|---|---|
| 3,879,633 A | * | 4/1975 | Stark, Jr. ...................... | 315/8 |
| 4,700,260 A | * | 10/1987 | Craig et al. .................. | 361/150 |
| 5,216,326 A | * | 6/1993 | Lundgren ...................... | 315/8 |
| 5,416,595 A | * | 5/1995 | Wield ......................... | 348/825 |
| 5,521,463 A | * | 5/1996 | Ogawa et al. ............... | 313/440 |
| 5,606,377 A | * | 2/1997 | Swank ........................ | 348/821 |

* cited by examiner

Primary Examiner—Chris Kelley  
Assistant Examiner—Charles Parsons  
(74) Attorney, Agent, or Firm—Joseph S. Tripoli; Joseph J. Laks; Daniel E. Sragow

(57) ABSTRACT

A degaussing coil is retained on the conical portion of a cathode ray tube by a resilient clip which snaps over a lug which is used to mount the cathode ray tube in its associated cabinet. The clip can be snapped over its respective mounting lug after the cathode ray tube has been mounted in its associated cabinet.

5 Claims, 3 Drawing Sheets

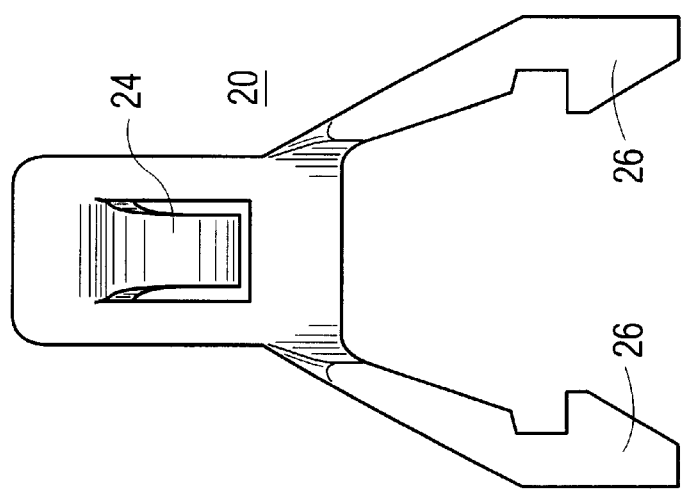
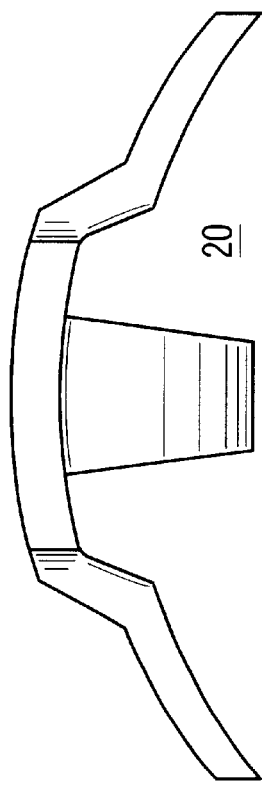
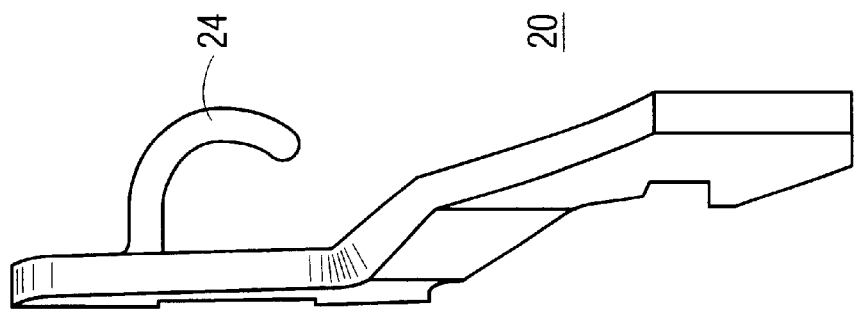

METHOD AND APPARATUS FOR MOUNTING A DEGAUSSING COIL

FIELD OF THE INVENTION

This invention relates to video display apparatus and, in particular, to a method and apparatus for positioning and mounting of a degaussing coil on a cathode ray tube of a video display apparatus.

BACKGROUND OF THE INVENTION

In order to remove residual magnetic fields resulting from the Earth's magnetic field, and nearby electromagnetic fields, on the electron beam landing positions of a cathode ray tube in a video display apparatus, it is necessary to periodically demagnetize, or degauss, the metallic portions of the cathode ray tube. Degaussing is accomplished by passing a decaying alternating current through a wire coil that is distributed about the cathode ray tube. Typically, this occurs each time the video display apparatus, such as a television receiver, is energized or turned on.

It is important that the degaussing coil be positioned properly on the tube to insure complete degaussing. This is particularly important for cathode ray tubes having large deflection angles and/or tubes having small phosphor element spacing or pitch, which provide little tolerance for electron beam landing errors.

Many cathode ray tubes have mounting lugs attached thereto to facilitate mounting the cathode ray tube in a cabinet. The instant invention provides a retainer for a degaussing coil which can be easily attached to a mounting lug after the cathode ray tube has been mounted in its cabinet.

SUMMARY OF THE INVENTION

In accordance with an aspect of the present invention, an arrangement for a video display apparatus comprises a cathode ray tube having a neck and a faceplate coupled by a conical portion. The cathode ray tube has mounting lugs attached thereto for mounting said cathode ray tube in a cabinet. A degaussing coil is positioned against the conical portion of the cathode ray tube. A resilient clip having one end coupled to the degaussing coil and another end being snapped around one of the mounting lugs retains the degaussing coil in position against the conical portion of the cathode ray tube.

In accordance with another aspect of the invention, a method of securing a degaussing coil to a cathode ray tube, which is mounted in a cabinet by means of a lug, comprises the steps (not necessarily in order) of securing the degaussing coil to a resilient clip and snapping the clip around the lug.

BRIEF DESCRIPTION OF THE DRAWING

In the accompanying Drawing:

FIG. 3 is a side view of the inventive clip;

FIG. 4 is a front view of the inventive clip;

FIG. 5 is a top view of the inventive clip; and

DETAILED DESCRIPTION

Figure 1:
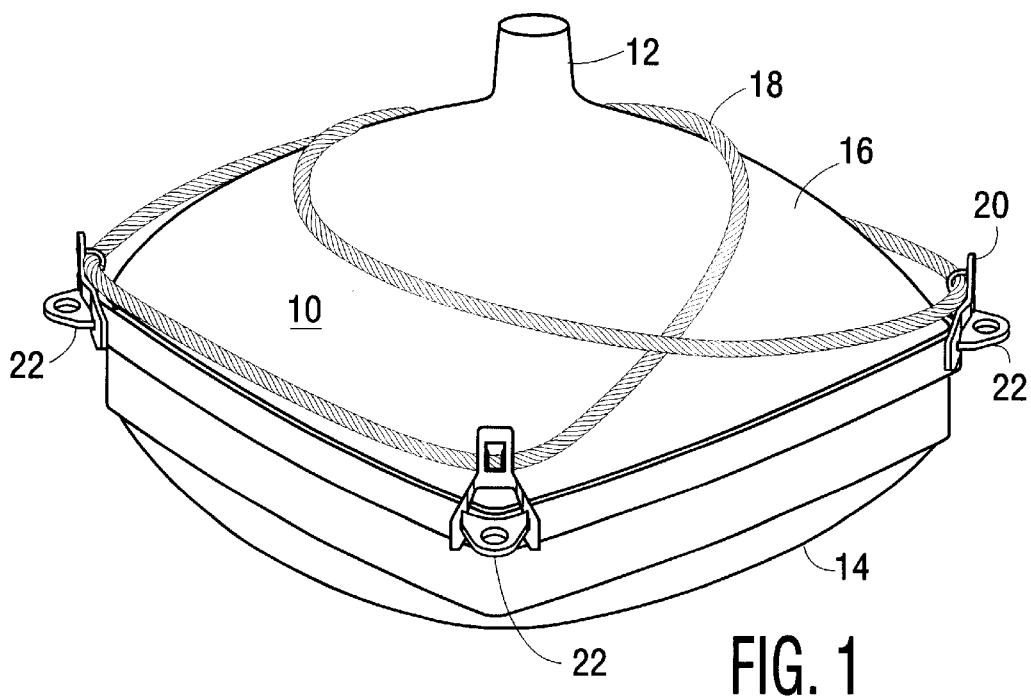
FIG. 1 shows a degaussing coil secured to the lugs of a cathode ray tube using the instant invention.

Referring to FIG. 1, a cathode ray tube 10 has a neck portion 12 (partially shown), a faceplate portion 14, and a conical portion 16 which couples neck 12 to faceplate 14. Degaussing coil 18 is held against conical portion 16 by clips 20 which are snapped onto mounting lugs 22.

Figure 2:
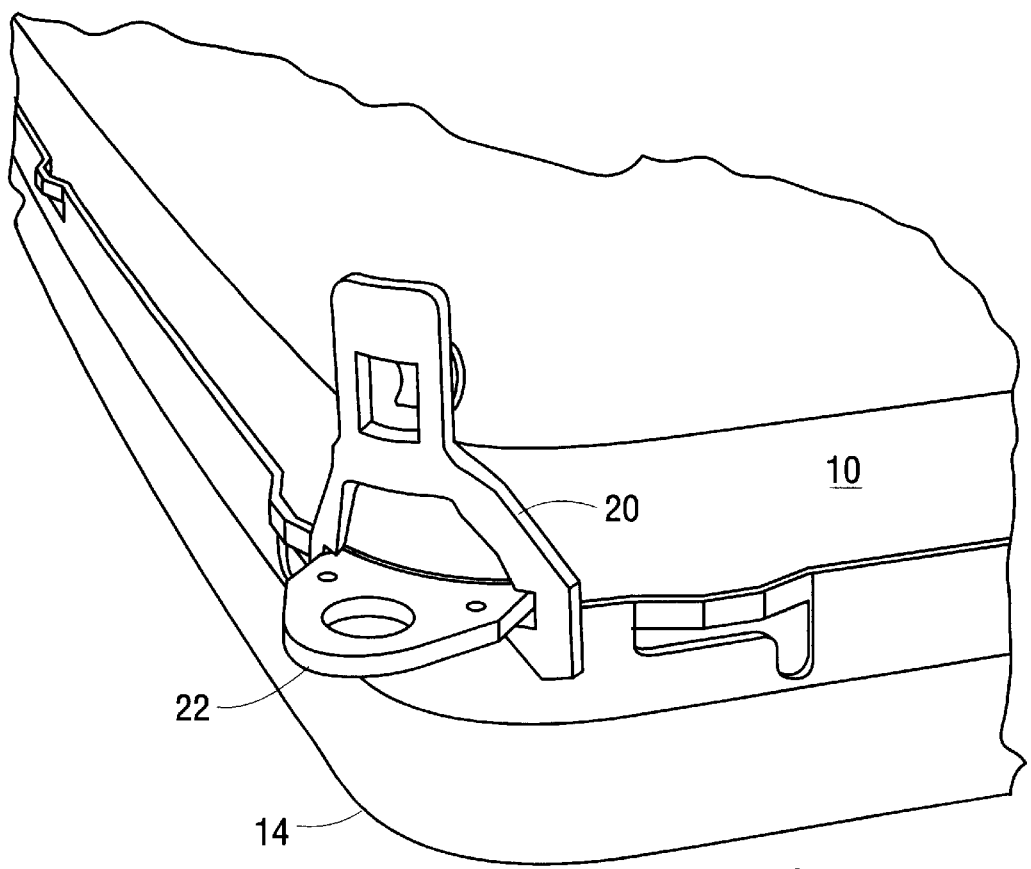
FIG. 2 shows the inventive clip positioned on a lug of a cathode ray tube.

FIG. 2 shows a more detailed view of a clip 20 mounted on lug 22 of cathode ray tube 10. It is to be noted that clip 20 has a shape which approximately conforms to the curvature of the corner of faceplate 14.

FIG. 3 is a side view of clip 20 showing hook 24 which is used to retain degaussing coil 18, shown in FIG. 1.

FIG. 4 shows a front view of clip 20.

FIG. 5 shows a top view of clip 20, illustrating the relationship between hook 24 and latch barbs 26, which provide the retaining function when clip 20 is snapped onto mounting lug 22.

Figure 6:
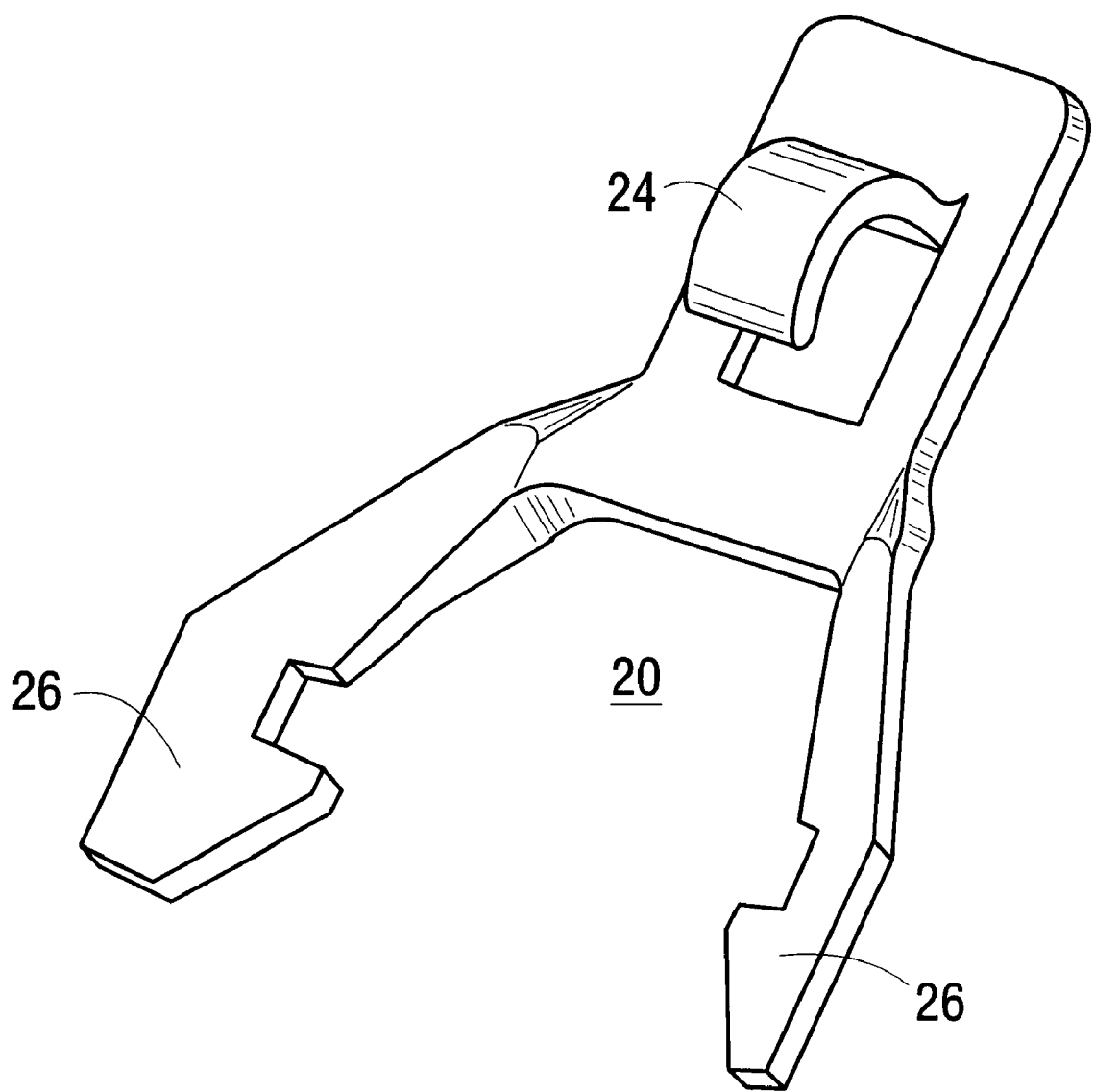
FIG. 6 is an isometric view of the inventive clip.

FIG. 6 is an isometric view of clip 20.

Clip 20 can be fabricated from a resilient material, such as plastic, using a molding process. Plastic is preferable to a metal material because it is more easily fabricated and is non-magnetic, so that it does not contribute to the material which must be degaussed.

The clip, according to the instant invention, is particularly useful after the cathode ray tube has been installed in its cabinet. As shown in FIGS. 1 and 2, the clip can be snapped around mounting lug 22 after the hole in mounting lug 22 has been filled by a bolt which attaches the lug to the cabinet. The invention therefore provides flexibility in the manufacturing process which allows the clip to be installed either before or after the cathode ray tube has been installed in the cabinet. Furthermore, the inventive clip can be used in the field to replace other degaussing coil retaining means which have broken in service or otherwise need replacement.

What is claimed is:

1. An arrangement for a video display apparatus comprising:
   a cathode ray tube having neck and faceplate portions coupled by a conical portion, said cathode ray tube having mounting lugs attached thereto for mounting said cathoderay tube in a cabinet;
   a degaussing coil positioned against the conical portion of said cathode ray tube; and
   a resilient clip having one end coupled to said degaussing coil, and another end, comprising a pair of latch barbs, snapped around one of said mounting lugs, for retaining said degaussing coil in position against the conical portion of said cathode ray tube.

2. An arrangement according to claim 1 in which said clip comprises a hook which retains said degaussing coil.

3. An arrangement according to claim 1 in which said clip has a shape which approximately conforms to the curvature of said cathode ray tube.

4. A method of securing a degaussing coil to a cathode ray tube, said cathode ray tube being mounted in a cabinet by means of a lug, said method comprising the steps of:
   a) securing said degaussing coil to a resilient clip; and
   b) snapping said clip around said lug after said lug is attached to both said cabinet and said cathode ray tube.

5. A method according to claim 4, in which said lug is attached to said cabinet and to said cathode ray tube at separated points of said lug, said clip being snapped around said lug at a point intermediate said separated points.

* * * * *